(12) United States Patent
Thompson

(10) Patent No.: US 6,540,634 B2
(45) Date of Patent: Apr. 1, 2003

(54) WHEEL DIFFERENTIAL SHIFT MECHANISM

(75) Inventor: David Thompson, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/729,334

(22) Filed: Dec. 4, 2000

(65) Prior Publication Data
US 2002/0103053 A1 Aug. 1, 2002

Related U.S. Application Data
(60) Provisional application No. 60/243,166, filed on Oct. 25, 2000.

(51) Int. Cl.⁷ .............................................. F16H 48/24
(52) U.S. Cl. ..................................... 475/86; 192/85 CA
(58) Field of Search ......................... 475/86, 231, 249; 74/473.11, 473.36; 192/85 CA, 69.8

(56) References Cited

U.S. PATENT DOCUMENTS

| | | | |
|---|---|---|---|
| 2,876,658 A | 3/1959 | McColl | 475/86 |
| 3,195,371 A | 7/1965 | Christie | 475/204 |
| 4,167,881 A | 9/1979 | Bell et al. | 475/86 |
| 4,271,722 A | 6/1981 | Campbell | 180/247 |
| 4,703,671 A | 11/1987 | Jikihara | 475/86 |
| 4,873,892 A * | 10/1989 | Ohkubo | 180/249 |
| 5,171,192 A * | 12/1992 | Schlosser et al. | 475/230 |
| 5,299,986 A | 4/1994 | Fabris et al. | 475/88 |
| 5,342,255 A | 8/1994 | Slesinski et al. | 475/231 |
| 5,639,074 A * | 6/1997 | Greenhill et al. | 267/158 |
| 5,673,777 A * | 10/1997 | Ziech | 192/108 |
| 5,947,252 A | 9/1999 | Ziech | 192/109 R |
| 5,947,859 A * | 9/1999 | McNamara | 475/231 |

FOREIGN PATENT DOCUMENTS

| | | | |
|---|---|---|---|
| JP | 59-54843 | * | 3/1984 |
| JP | 5-338451 A | * | 12/1993 |

* cited by examiner

Primary Examiner—Ankur Parekh
(74) Attorney, Agent, or Firm—Dykema Gossett PLLC

(57) ABSTRACT

A wheel differential having an improved differential lock assembly is provided. The differential includes a differential housing and a differential cage rotatably supported on the differential housing by a set of bearings. The differential also includes a clutch assembly having a first member fixed to the differential cage and a second member configured to receive an axle half shaft extending from the differential cage for rotation with the axle half shaft. Finally, the differential includes an improved differential lock assembly that selectively shifts the first and second clutch members into engagement to prevent relative rotation between the differential cage and axle half shaft. The lock assembly includes a shift chamber that is supported on an outer race member of the set of bearings. The shift chamber may be formed within a bearing cap that is coupled to the differential housing and disposed about at least a portion of the bearing set. The lock assembly further includes a piston disposed within the shift chamber and a pushrod coupled to the piston. A shift arm is also coupled to the pushrod and is configured to engage the second member of the clutch assembly. The piston may be urged in a first direction and a second direction, opposite the first direction, within the shift chamber by the application of biasing and/or fluid forces.

20 Claims, 5 Drawing Sheets

WHEEL DIFFERENTIAL SHIFT MECHANISM

This application claims priority to U.S. Provisional Patent Application No. 60/243,166 filed Oct. 25, 2000.

BACKGROUND OF THE INVENTION

1. Field of the Invention

This invention relates to vehicle wheel differentials and, in particular, to a differential lock assembly, or shift mechanism, for the differential.

2. Disclosure of Related Art

Wheel differentials are provided on vehicles to enable a pair of wheels on a common rotational axis to rotate at different speeds while the vehicle is turning. Under certain conditions (e.g., when one of the wheels is traveling over wet or icy pavement while the other wheel is on dry pavement), however, it is desirable to ensure that the differential is locked and that the wheels rotate at the same speed even while turning to ensure increased traction. Accordingly, conventional differentials generally include a differential lock assembly to selectively lock the differential and thereby prevent wheels disposed about a common rotational axis from rotating at different speeds.

A conventional differential includes a differential housing and a differential cage supported thereon by two sets of bearings. The differential further includes a clutch assembly having fixed and sliding clutch members. The fixed clutch member is fixedly coupled to one portion of the differential cage. The sliding clutch member is coupled for rotation with one of two axle half shafts extending from the differential cage. A differential lock assembly is used to selectively shift the sliding clutch member into engagement with the fixed clutch member to thereby prevent relative rotation between the axle half shaft and the differential cage and thereby prevent the wheels supported on the two axle half shafts extending from the cage from rotating at different speeds.

Conventional differentials suffer from several disadvantages due to the location and configuration of the differential lock assembly. First, the size and location of the differential lock assembly often interferes with the placement and/or operation of vehicle suspension components. Second, the lock assembly components are often relatively large in size thereby increasing material, inventory, and tooling costs. Further, the lock assembly components are often difficult to modify without requiring a relatively large number of additional modifications to other components of the differential. Finally, the relatively complex configuration of conventional lock assemblies makes assembly relatively difficult thereby increasing the assembly time and cost.

There is thus a need for an improved wheel differential that will minimize or eliminate one or more of the above-mentioned deficiencies.

SUMMARY OF THE INVENTION

The present invention provides a wheel differential having an improved differential lock assembly.

A wheel differential in accordance with the present invention includes a differential housing and a differential cage rotatably supported on the differential housing by a set of bearings. The differential also includes a clutch assembly having a first member fixed to the differential cage and a second member configured to receive an axle half shaft extending from the differential cage for rotation with the axle half shaft. Finally, the differential includes a differential lock assembly. The lock assembly includes a shift chamber that is supported on an outer race member of the set of bearings. The shift chamber may be formed within a bearing cap that is coupled to the differential housing and disposed about at least a portion of the bearing set. The lock assembly further includes a piston disposed within the shift chamber and a pushrod coupled to the piston. A shift arm is also coupled to the pushrod and is configured to engage the second member of the clutch assembly. The piston may be urged in a first direction and a second direction, opposite the first direction, within the shift chamber by the application of biasing or fluid forces. In one embodiment, a spring biases the piston in a first direction while a pneumatic force selectively urges the piston in a second direction against the force of the spring. In another embodiment, pneumatic forces are used to urge the piston in both the first and second directions.

A differential in accordance with the present invention represents a significant improvement as compared to conventional wheel differentials. First, placement of the lock assembly shift chamber on the outer race member of the bearing set moves the components of the lock assembly substantially within the differential housing. As a result, the lock assembly does not interfere with the placement and/or operation of vehicle suspension components. Placement of the lock assembly shift chamber on the outer race member of the bearing set also reduces the size of, and material required for, the differential cage and shift yoke—among other components of the differential. This reduction in size and in material requirements reduces inventory, tooling, and manufacturing costs. Second, integration of the shift chamber into the bearing cap results in the additional advantage that modifications to the lock assembly can be made without extensive modifications to other differential components. Third, the less complex design of the inventive differential makes assembly of the differential easier thereby reducing assembly time and capital equipment needs.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
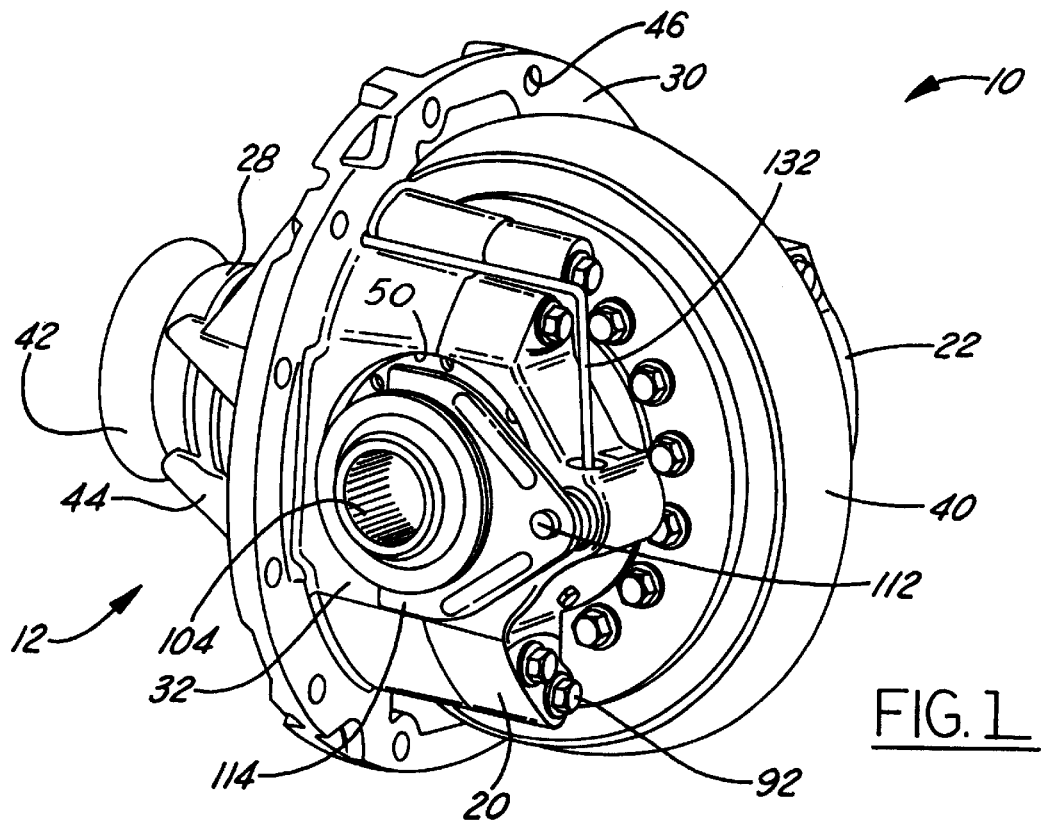
FIG. 1 is a perspective view of a wheel differential accordance with the present invention.
Figure 2:
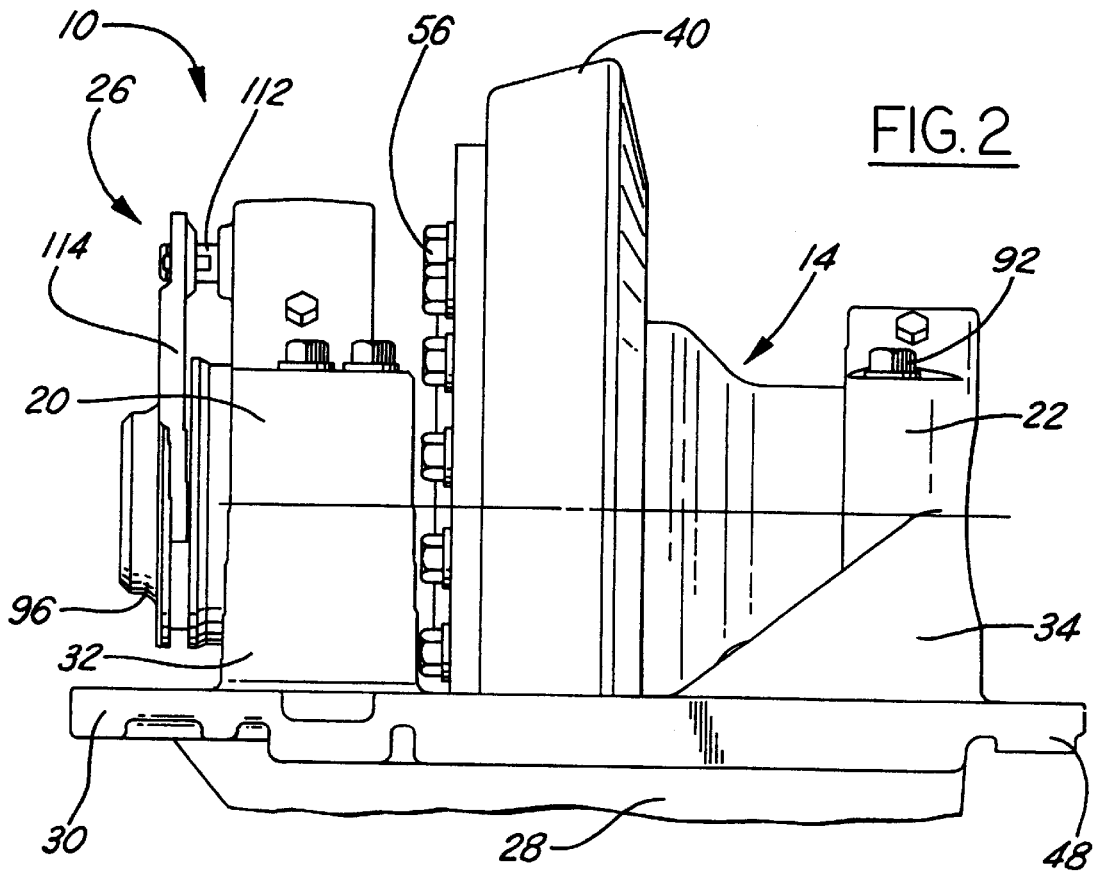
FIG. 2 is partial plan view of the wheel differential of FIG. 1.
Figure 3:
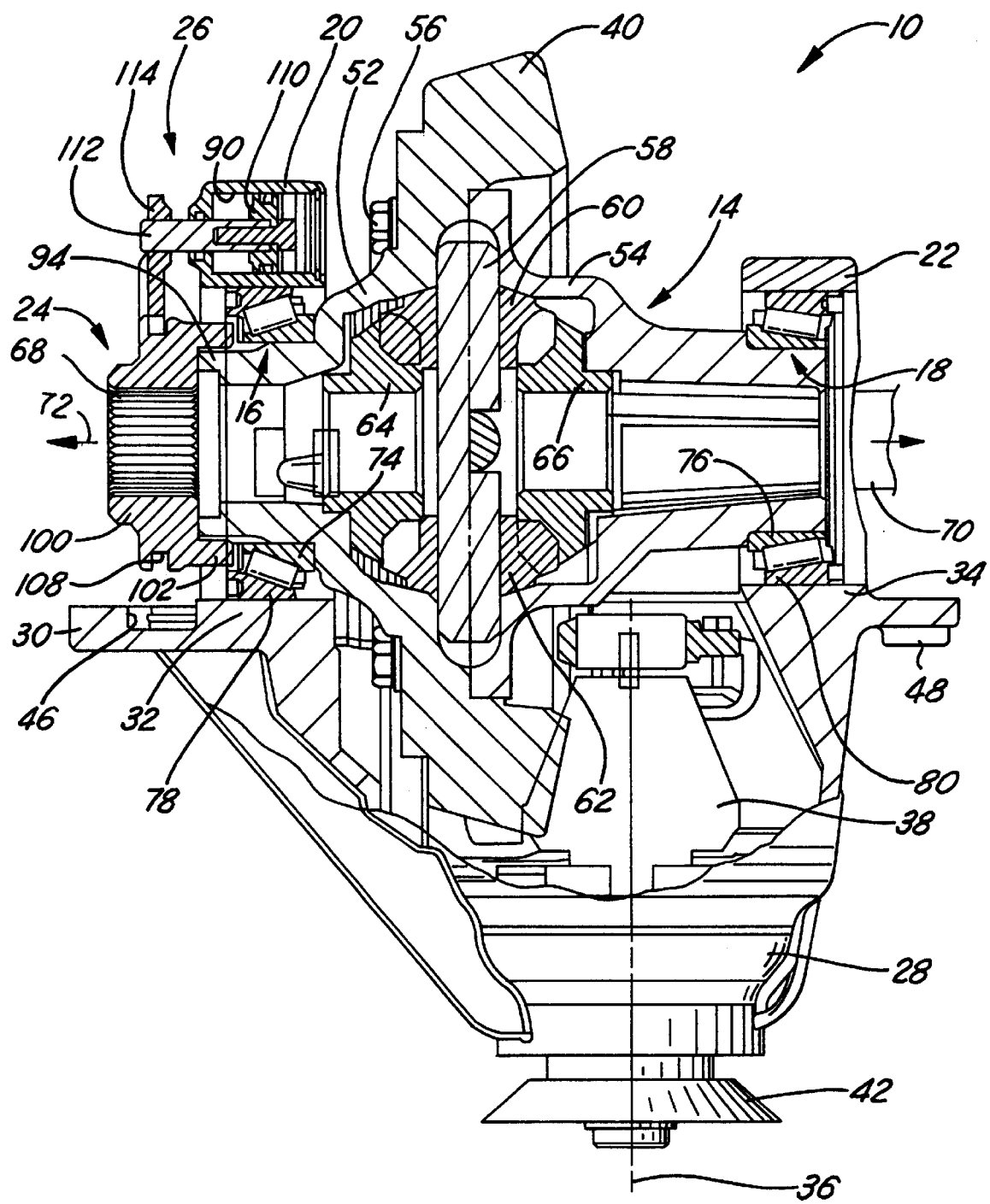
FIG. 3 is a sectional view of the wheel differential of FIG. 1.

Referring now to the drawings wherein like reference numerals are used to identify identical components in the various views, FIGS. 1–3 illustrate a wheel differential 10 in accordance with the present invention. Differential 10 is provided to enable two wheels (not shown) in a vehicle that are disposed about a common rotational axis to rotate at different speeds. Differential may include a differential housing 12, a differential cage 14, bearing sets 16, 18, bearing caps 20, 22, a clutch assembly 24, and a differential lock assembly 26.

Housing 12 provides support for, and maintains the relative position of, the other components of differential 10. Housing 12 also provides protection for the components of differential 10 against external objects or elements. Housing 12 is conventional in the art and may be made from conventional metals and metal alloys. As will be understood by those of skill in the art, the size, shape and configuration of housing 12 will vary depending upon design requirements associated with the other components of differential 10. In the illustrated embodiment, housing 12 includes a body portion 28, a circular flange portion 30 and bearing support portions 32, 34.

Body portion 28 is configured to receive an input shaft (not shown) disposed about an axis of rotation 36, a pinion gear 38 that is disposed about and driven by the input shaft, bearing sets (not shown) for maintaining the position of, and allowing rotation of, the input shaft and pinion gear 38, and a portion of a ring gear 40 that meshes with pinion gear 38 and is driven by pinion gear 38 in a known manner. A yoke 42 may be secured to one end of the input shaft and extend into body portion 28. Body portion 28 may include a plurality of fins 44 radiating therefrom for connection with flange portion 30 for increased structural support.

Flange portion 30 is provided for coupling to a corresponding axle housing (not shown). Flange portion 30 may be integral with body portion 28 and may include a plurality of apertures 46 configured to received bolts 48, screws, or other fasteners for coupling housing 12 to the axle housing.

Bearing support portions 32, 34 are configured to receive bearing sets 16, 18, respectively. Portions 32, 34 may be integral with flange portion 30 and extend from one side of flange portion 30 opposite body portion 28. Each of bearing support portions 32, 34 includes a semicircular recess 50 (best shown in FIG. 1) configured to receive a portion of a corresponding bearing set 16, 18.

Differential cage 14 is provided to support and house the differential gears and is conventional in the art. Cage 14 may be made from conventional metals and metal alloys. It should be understood by those of skill in the art that the size, shape, and configuration of cage 14 will vary depending upon the size, shape, and configuration of the differential gears. Cage 14 is supported for rotation within housing 12 by bearing sets 16, 18. Referring to FIG. 3, cage 14 may be comprised of first and second members 52, 54 that are coupled together using bolts 56, screws, or other fasteners. In the illustrated embodiment, member 52 is integral with ring gear 40. Alternatively, gear 40 may comprise a separate component coupled to member 52 by bolts, screws, or other fasteners. Disposed within cage 14 is a conventional spindle 58 that supports a pair of bevel gears 60, 62. Gears 60, 62 mesh with bevel gears 64, 66 that are in turn coupled to a corresponding pair of axle half shafts 68, 70 extending through members 52, 54 along an axis of rotation 72.

Bearing sets 16, 18 are provided to allow rotation of cage 14 relative to housing 12. Bearing sets 16, 18 are conventional in the art and may comprise roller bearings. Each bearing set 16, 18 includes an inner race member 74, 76 and an outer race member 78, 80, respectively. Each of members 74, 76 is disposed against a radially outer surface of cage 14 proximate one axial end of cage 14. Each of members 78, 80 is received within a corresponding bearing support portion 32, 34 of housing 12 and a bearing cap 20, 22 as described in greater detail hereinbelow.

Figure 4:
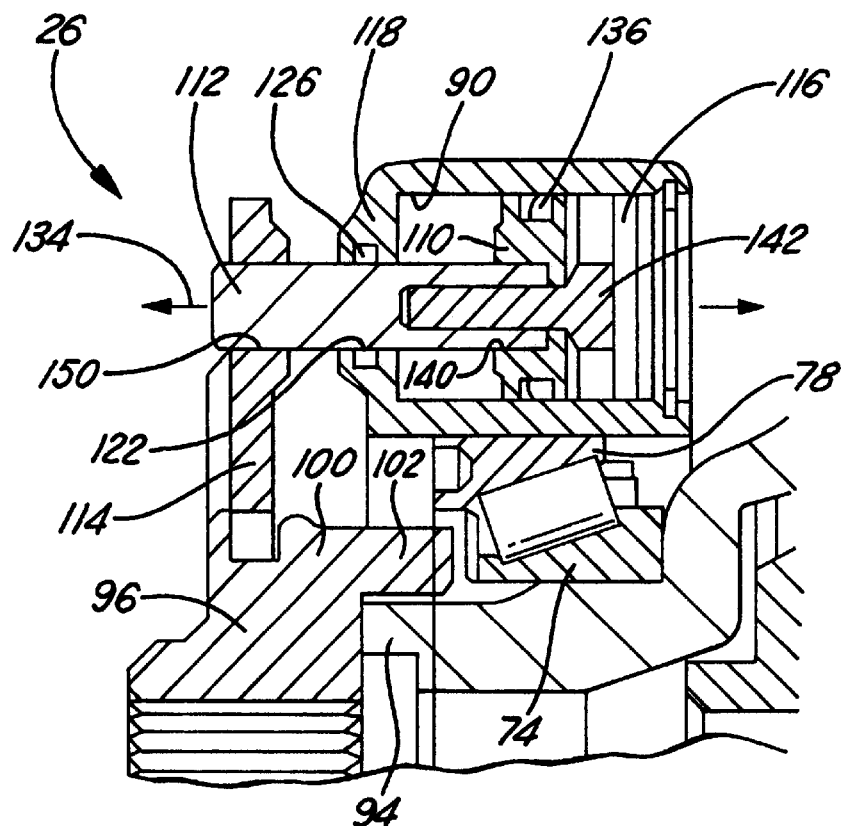
FIG. 4 is an enlarged sectional view of the differential lock assembly of the wheel differential of FIG. 1.
Figure 5:
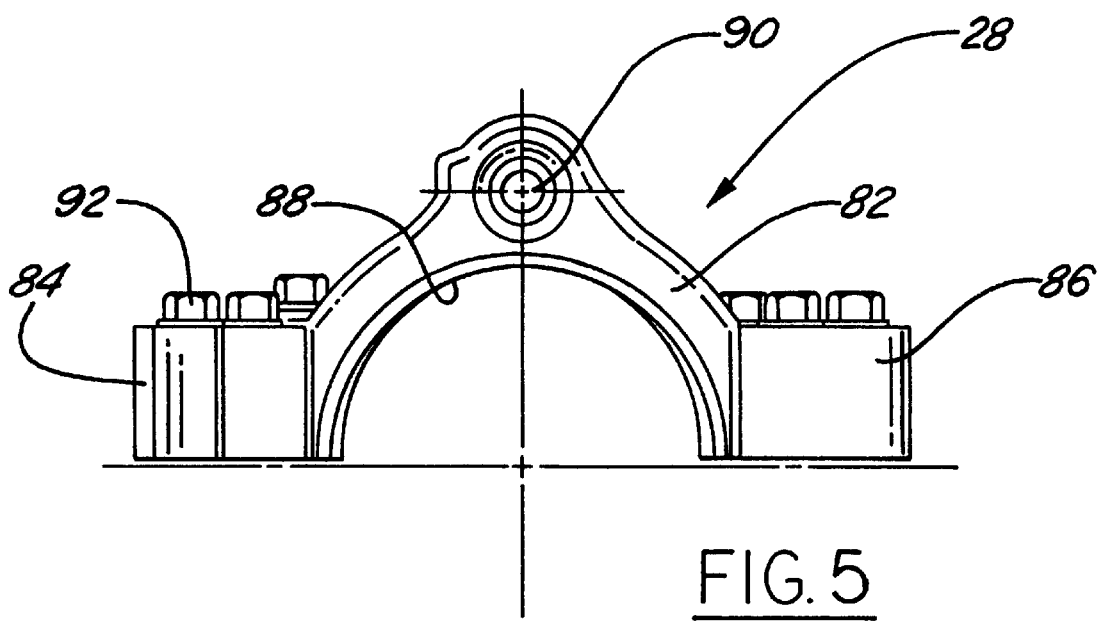
FIG. 5 is a plan view of one of the bearing caps of the wheel differential of FIG. 1.

Bearing caps 20, 22 are provided to house bearing sets 16, 18, respectively. Bearing caps 20, 22 may be made from conventional metals and metal alloys. Referring to FIG. 5, bearing cap 20 is illustrated in greater detail. In the illustrated embodiment, cap 20 includes a generally semicircular body portion 82 terminating in a pair of mounting flanges 84, 86. It should be understood, however, that the size, shape, and configuration of bearing cap 20 may vary without departing from the spirit of the claimed invention. Portion 20 includes an arcuate recess 88 (which is semicircular in the illustrated embodiment) that is configured to receive outer race member 78 of bearing set 16. In accordance with the present invention, portion 82 further defines a shift chamber 90 for differential lock assembly 26 that is adjacent to and supported by outer race member 78 of bearing set 16 (best shown in FIG. 4) Chamber 90 is described in greater detail hereinbelow. In the illustrated embodiment, chamber 90 is arcuately centered in body portion 82 relative to recess 88. It should be understood, however, that the arcuate position of chamber 90 may be varied without departing from the spirit of the claimed invention. Flanges 84, 86 are provided to enable mounting of cap 20 to bearing support portion 32 of housing 12. Cap 20 may be mounted to housing 12 by bolts 92, screws, or other fasteners extending through flanges 64, 86 and into bearing support portion 32. Referring again to FIGS. 1–2, cap 22 is substantially the same in structure and function as cap 20, but does not define a shift chamber.

Referring to FIG. 3, clutch assembly 24 is provided to allow selective coupling of cage 14 and axle half shaft 68 to prevent relative rotation between cage 14 and shaft 68. Clutch assembly 24 is conventional in the art and includes a fixed member 94 fixedly coupled to cage 14 and a sliding member 96 disposed about, and coupled for rotation with, shaft 68. Members 94, 96 may be made from steel or other metal alloys and may be heat-treated to reduce wear.

Figure 6:
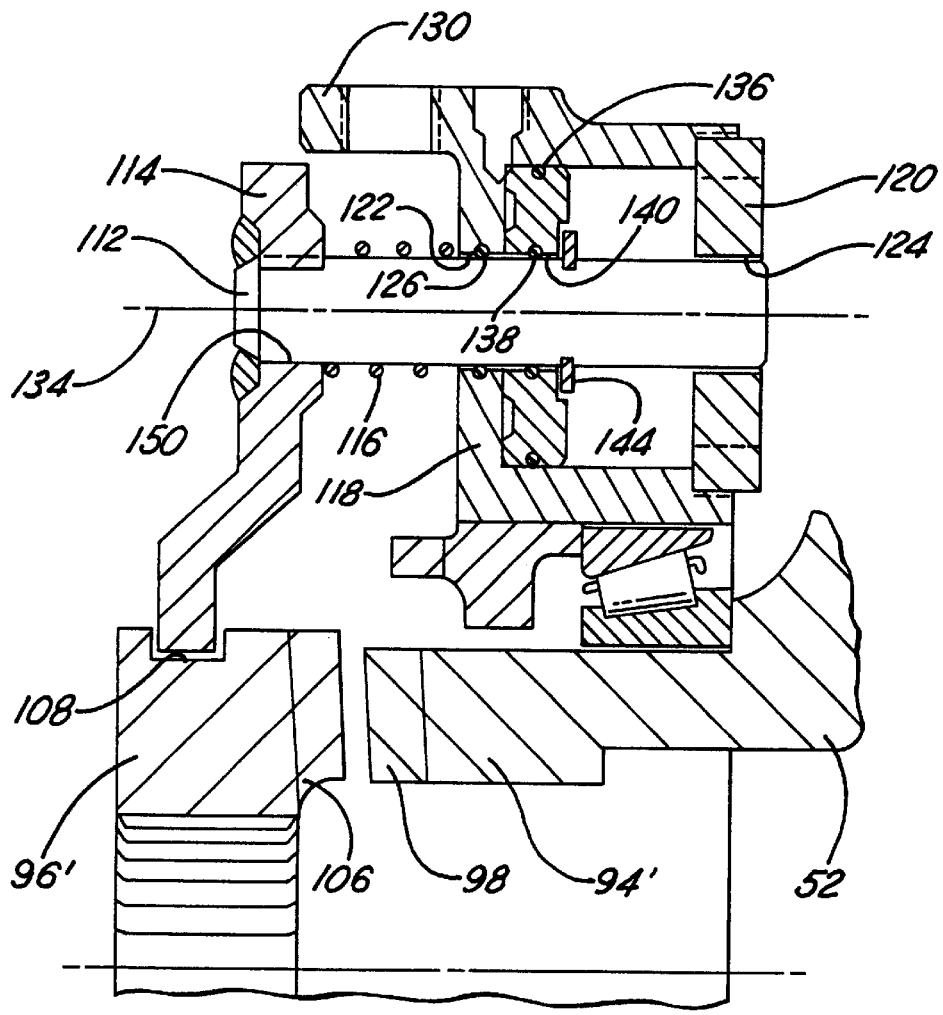
FIG. 6 is a sectional view of an alternate embodiment of a differential lock assembly for a wheel differential in accordance with the present invention.

Fixed member 94 is disposed about, or extends axially from, one axial end of cage 14. Member 94 is fixed to cage 14 and may be integral with cage 14 or may form a separate component fixedly coupled to cage 14 for rotation therewith. In the embodiment illustrated in FIG. 3, member 94 is integral with cage 14 and comprises a plurality of axially-extending spline teeth (not shown) disposed about a radially outer surface of one axial end of cage 14. Referring to FIG. 6, in an alternate embodiment, member 94 comprises a plurality of teeth 98 extending axially from one end of cage 14.

Sliding member 96 is disposed about, and is axially movable relative to, shaft 68. Referring to FIG. 3, in one embodiment, member 96 includes an annular body 100 having an axially extending flange 102. Referring to FIG. 1, body 100 includes a plurality of axially-extending splines 104 on a radially inner surface configured engage corresponding splines (not shown) on shaft 68. Referring again to FIG. 3, flange 102 also includes a plurality of axially-extending splines (not shown) that are configured to selectively engage with splines (not shown) of fixed member 94. Referring now to FIG. 6, in an alternate embodiment member 96 may alternatively include a plurality of curvic teeth 106 configured to engage teeth 98 of fixed member 94. Referring again to FIG. 3, sliding member 96 may also include a groove 108 disposed about at least a portion of the circumference of body 100 for a purpose to be described hereinbelow.

Differential lock assembly 26 is provided to cause selective engagement of fixed and sliding members 94, 96 of clutch assembly 24 to thereby prevent relative rotation between cage 14 and shaft 68. Assembly 26 may include shift chamber 90, a piston 110, a pushrod 112, and a shift arm 114. Assembly 26 may also includes means, such as spring 116, for biasing piston 110, pushrod 112, and shift arm 114 in a first direction.

Figure 8:
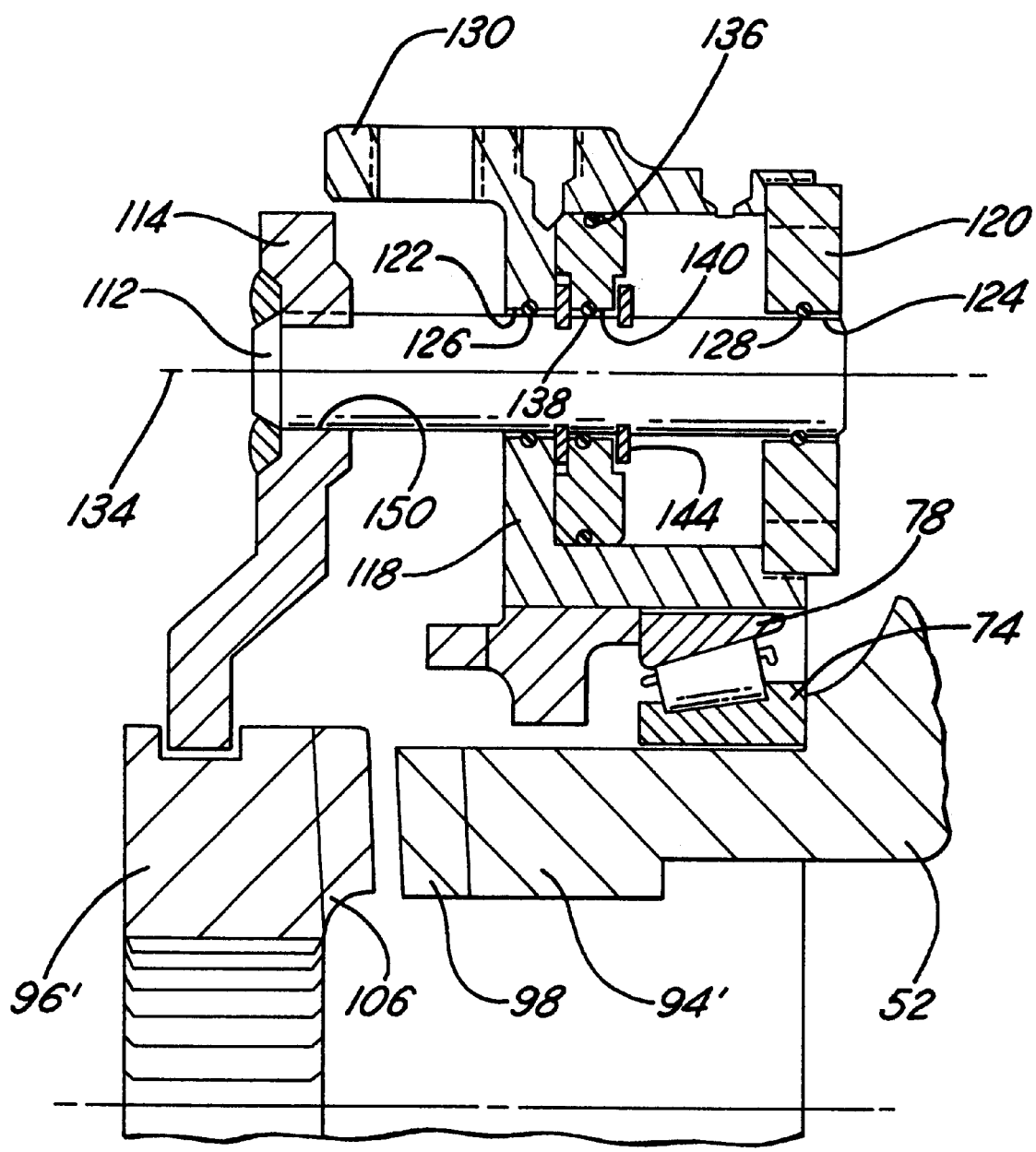
FIG. 8 is a sectional view of another alternate embodiment of a differential lock assembly for a wheel differential in accordance with the present invention.

Chamber 90 provide a space to receive piston 110 and pneumatic or hydraulic fluid for buildup of a fluid force to thereby cause movement of piston 110. Referring to FIG. 5, chamber 90 may be cylindrical in cross-section. It should be understood, however, that the size and shape of chamber 90 may vary. Referring to FIGS. 4, 6, and 8, chamber 90 includes one or more end walls 118, 120. Walls 118, 120 include apertures 122, 124, respectively, configured to receive pushrod 112 and may include grooves configured to receive seals 126, 128 in order to prevent pneumatic or hydraulic fluid from leaking around pushrod 112 and through apertures 122, 124. As illustrated in FIGS. 6 and 8, end wall 120 may comprise a separate support plate coupled to the other walls of chamber 90. Plate 120 may be made from plastic. Also with reference to FIGS. 6 and 8, chamber 90 may include an axial extension 130 configured to receive a sensor (not shown) for detecting a locked condition in differential 10. Referring to FIG. 1, pneumatic or hydraulic fluid is supplied to chamber 90 through one or more supply lines 132 extending through a wall of chamber 90.

Referring to FIGS. 4, 6, and 8, chamber 90 is adjacent to and supported on outer race member 78 of bearing set 16. The location of chamber 90 represents a significant improvement as compared to conventional wheel differentials. In particular, the location of chamber 90 allows the entire lock assembly 26 to be disposed within the combined differential and axle housing. As a result, the lock assembly 26 does not interfere with the location or operation of vehicle suspension components. Further, the location of chamber 90 reduces the material requirements of cage 14 (which includes an extra web portion defining a chamber wall in many conventional differentials), shift arm 114 (which is disposed closer to clutch assembly 24 than in conventional differentials) and other components of differential 10 thereby reducing material, inventory, tooling, and manufacturing costs. Referring again to FIG. 5, chamber 90 may be disposed within bearing cap 20. The integration of chamber 90 in bearing cap 20 also provides a significant advantage as compared to conventional differentials. In particular, the integration allows modifications to the lock assembly 26 without numerous modifications to other components of differential 10. Rather, only bearing cap 20 will generally require modification.

Piston 110 provides a force-bearing surface to allow displacement of pushrod 112 and shift arm 114. Piston 110 is conventional in the art and may be made from plastic. Piston 110 is movable within chamber 90 along an axis 134. Piston 110 includes a radially outer groove configured to receive a seal 136 that prevents pneumatic or hydraulic fluid from leaking around piston 110. In the embodiments illustrated in FIGS. 6 and 8, piston 110 further includes a radially inner groove configured to receive another seal 136. Referring again to FIG. 4, piston 110 also includes an aperture 140 configured to receive pushrod 112. Piston 110 may be coupled to pushrod 112 in a variety of ways. In the embodiment shown in FIG. 4, piston 110 is coupled to pushrod 112 with a bolt 142, screw, or other fastener that extends through aperture 140 and into pushrod 112. Referring to FIGS. 6 and 8, in alternative embodiments, piston 110 may be maintained in place on pushrod 112 by one or more stops 144.

Figure 7:
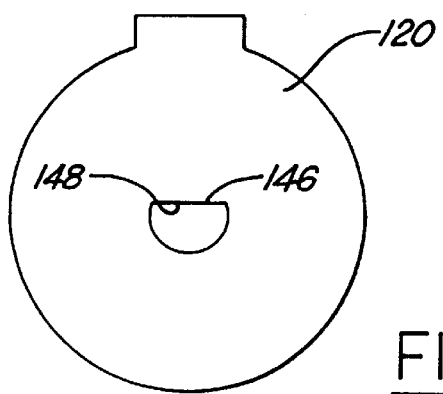
FIG. 7 is a sectional view of a portion of the differential lock assembly of FIG. 6.

Pushrod 112 is provided to move shift arm 114 responsive to movement of piston 110 within chamber 90. Pushrod 112 may be made from conventional metals or metal alloys. Pushrod 112 may be generally circular in cross-section, but may take on a variety of other shapes. Referring to FIG. 7, pushrod 112 may include a milled flat 146 extending along at least a portion of pushrod 112. Flat 146 may engage a corresponding flat 148 in one or more of end walls 118, 120 of chamber 90 to prevent rotation of pushrod 112 and, therefore, shift arm 114 during assembly or thereafter. Referring again to FIGS. 3–4, pushrod 112 is coupled to shift arm 114 in addition to piston 110. In the illustrated embodiment, pushrod 112 is received within an aperture 150 in shift arm 114. Pushrod 112 may be prevented from movement along axis 134 relative to shift arm 114 in a conventional manner.

Shift arm 114 is provided to shift sliding member 96 of clutch assembly 24 into and out of engagement with fixed member 94 of assembly 24. Shift arm 114 may be made from conventional metals and metal alloys and may be heat-treated to harden shift arm 114. Referring to FIG. 1, in the illustrated embodiment arm 114 comprises a generally triangular plate having a semicircular recess. It should be understood, however, that the size, shape, and configuration of arm 114 may be varied without departing from the spirit of the claimed invention. Referring again to FIG. 4, arm 114 is coupled to pushrod 112 for movement therewith and is configured to be received within groove 108 of sliding member 96.

Spring 116 provides a means for biasing piston 110, pushrod 112, and shift arm 114 in a first direction along axis 134. In the illustrated embodiments, spring 116 biases these components so as to bias clutch members 94, 96 to a disengaged position. Spring 116 may comprise a conventional coil spring, but may alternatively comprise a wave spring to minimize the axial length of shift chamber 90 and, therefore, the size of lock assembly 26 and differential 10. Referring to FIG. 4, spring 116 may be disposed within chamber 90 with one end against end wall 120 of chamber 90 and a second end disposed against one face of piston 110. Referring to FIG. 6, in an alternate embodiment spring 116 may be disposed outside of chamber 90 with one end disposed against end wall 118 of chamber 90 and a second end disposed against shift arm 114.

In operation, spring 116 biases piston 110 in a first direction (to the left in FIGS. 4, 6, and 8), thereby urging pushrod 112, shift arm 114, and sliding member 96 of clutch assembly 24 in the same direction. This action places members 94, 96 of clutch assembly 24 in a disengaged position and shaft 68 and cage 14 are capable of relative rotation. Under predetermined conditions, pneumatic or hydraulic fluid pressure is introduced into chamber 90 and urges piston 110 in a second direction (to the right in FIGS. 4, 6, and 8), thereby urging pushrod 112, shift arm 114, and sliding member 96 of clutch assembly 24 in the same direction. This action causes member 96 to engage fixed member 94 of clutch assembly 24 and locks the differential 10 such that relative rotation of shaft 68 and cage 14 is prevented. Referring to FIG. 8, it should be understood that spring 116 may be omitted and pneumatic or hydraulic fluid pressure may be used to urge piston 110 in both the first and second directions. This latter embodiment is advantageous because it further reduces the axial length of chamber 90.

A differential 10 in accordance with the present invention represents a significant improvement as compared to conventional differentials. In addition to the advantages mentioned hereinabove relative to placement of the lock assembly shift chamber 90 and its integration into the bearing cap 20, the inventive differential 10 has a less complex design as compared to conventional differentials. As a result, assembly of the differential 10 is made easier thereby reducing assembly time and capital equipment needs.

While the invention has been particularly shown and described with reference to the preferred embodiments thereof, it is well understood by those skilled in the art that various changes and modifications can be made in the invention without departing from the spirit and scope of the invention.

I claim:

1. A wheel differential, comprising:
   a differential housing;
   a differential cage rotatably supported on said differential housing by a set of bearings;
   a clutch assembly having a first member fixed to said differential cage and a second member configured to receive an axle half shaft extending from said differential cage for rotation with said axle half shaft; and,
   a differential lock assembly including:
      a shift chamber disposed radially outwardly of an outer race member of said set of bearings;
      a piston disposed within said shift chamber;
      a pushrod coupled to said piston; and,
      a shift arm coupled to said pushrod and configured to engage said second member of said clutch assembly.

2. The differential of claim 1, further comprising a spring that biases said piston in a first direction.

3. The differential of claim 2 wherein said spring comprises a wave spring.

4. The differential of claim 2 wherein a fluid force selectively urges said piston in a second direction, opposite said first direction.

5. The differential of claim 1 wherein said piston is urged in a first direction by a first fluid force and said piston is urged in a second direction, opposite said first direction, by a second fluid force.

6. The differential of claim 1 wherein said pushrod includes a flat and said shift chamber includes a support plate having an aperture with a corresponding flat, said aperture configured to receive said pushrod.

7. A wheel differential, comprising:
   a differential housing;
   a differential cage rotatably supported on said differential housing by a set of bearings;
   a bearing cap coupled to said differential housing and disposed about at least a portion of said set of bearings;
   a clutch assembly having a first member fixed to said differential cage and a second member configured to receive an axle half shaft extending from said differential cage for rotation with said axle half shaft; and,
   a differential lock assembly including:
      a shift chamber formed in said bearing cap;
      a piston disposed within said shift chamber;
      a pushrod coupled to said piston; and,
      a shift arm coupled to said pushrod and configured to engage said second member of said clutch assembly.

8. The differential of claim 7, further comprising a spring that biases said piston in a first direction.

9. The differential of claim 8 wherein said spring comprises a wave spring.

10. The differential of claim 8 wherein a fluid force selectively urges said piston in a second direction, opposite said first direction.

11. The differential of claim 7 wherein said piston is urged in a first direction by a first fluid force and said piston is urged in a second direction, opposite said first direction, by a second fluid force.

12. The differential of claim 7 wherein said pushrod includes a flat and said shift chamber includes a support plate having an aperture with a corresponding flat, said aperture configured to receive said pushrod.

13. The differential of claim 7 wherein said bearing cap defines an arcuate recess and said shift chamber is arcuately centered relative to said recess.

14. A wheel differential, comprising:
   a differential housing;
   a differential cage rotatably supported on said differential housing by a set of bearings;
   a ring gear coupled to said differential cage for rotation therewith;
   a drive pinion in mesh with said ring gear and having an axis of rotation;
   a clutch assembly having a first member fixed to said differential cage and a second member configured to receive an axle half shaft extending from said differential cage for rotation with said axle half shaft; and,
   a differential lock assembly including:
      a shift chamber disposed radially outwardly of an outer race member of said set of bearings;
      a piston disposed within said shift chamber;
      a pushrod coupled to said piston; and,
      a shift arm coupled to said pushrod and configured to engage said second member of said clutch assembly;
   wherein said differential lock assembly and said ring gear are located on the same side of said axis of rotation of said drive pinion.

15. The differential of claim 14, further comprising a spring that biases said piston in a first direction.

16. The differential of claim 15 wherein said spring comprises a wave spring.

17. The differential of claim 15 wherein a fluid force selectively urges said piston in a second direction, opposite said first direction.

18. The differential of claim 15 wherein said piston is urged in a first direction by a first fluid force and said piston is urged in a second direction, opposite said first direction, by a second fluid force.

19. The differential of claim 14 wherein said pushrod includes a flat and said shift chamber includes a support plate having an aperture with a corresponding flat, said aperture configured to receive said pushrod.

20. The differential of claim 14, further comprising a bearing cap coupled to said differential housing and disposed about at least a portion of said set of bearings, said shift chamber formed in said bearing cap.

* * * * *